No. 855,553. PATENTED JUNE 4, 1907.
J. W. AYLSWORTH.
PROCESS OF MAKING DUPLICATE PHONOGRAPH RECORDS.
APPLICATION FILED MAY 16, 1906. RENEWED APR. 4, 1907.
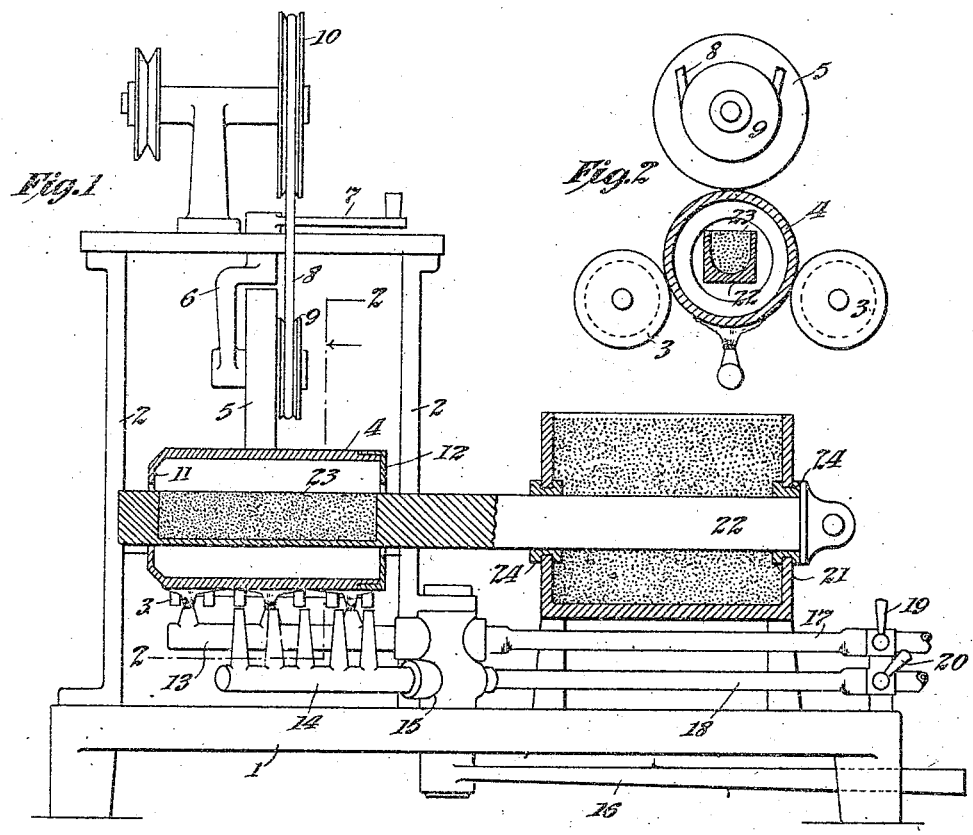
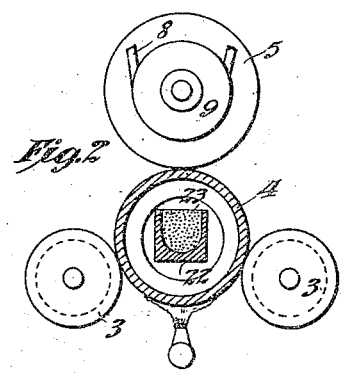
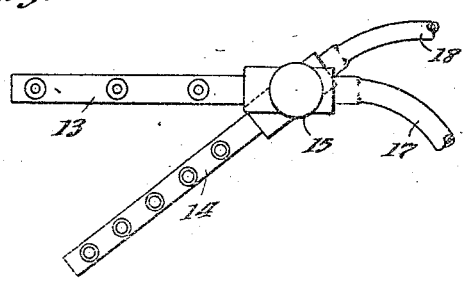
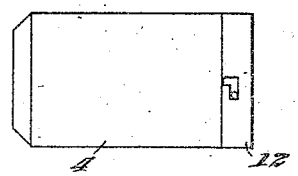
Witnesses:
Frank D. Lewis
Anna R. Klehm
Inventor:
Jonas W. Aylsworth
by Frank L. Dyer
Atty.

though it is desirable to cool the same to a sufficient extent to cause the material to shrink away sufficiently so that it

UNITED STATES PATENT OFFICE.

JONAS W. AYLSWORTH, OF EAST ORANGE, NEW JERSEY, ASSIGNOR TO NEW JERSEY PATENT COMPANY, OF WEST ORANGE, NEW JERSEY, A CORPORATION OF NEW JERSEY.

PROCESS OF MAKING DUPLICATE PHONOGRAPH-RECORDS.

No. 855,553.     Specification of Letters Patent.     Patented June 4, 1907.

Application filed May 16, 1906. Renewed April 4, 1907. Serial No. 366,428.

*To all whom it may concern:*

Be it known that I, JONAS W. AYLSWORTH, a citizen of the United States, residing at 223 Midland avenue, East Orange, county of Essex, and State of New Jersey, have invented a certain new and useful Process of Making Duplicate Phonograph-Records, of which the following is a description.

In an application for Letters Patent filed May 11th, 1906, Serial No. 316,250, I describe an improved process and apparatus for making duplicate phonograph records, in which a heated mold is rapidly rotated and a charge of molten material is supplied to the mold, so as to be distributed uniformly over the bore thereof while in a fluid condition, thereby driving any air or gas bubbles inwardly, after which the mold is rapidly cooled while being still rotated so as to cause the material to set and harden.

My present invention relates to an improved process of the general type disclosed in said application, but wherein the material of which the record is to be made is introduced within the mold in a solid condition, preferably in the form of a powder or small granules. Such a process is especially advantageous in connection with the molding of materials having a high melting point, or which are stringy or extremely viscid when molten so as to be difficult of manipulation in that condition, such as asphalt, shellac compositions, copal gum or compounds employing these ingredients. Even for the molding of records from ordinary wax-like compositions of the type disclosed in my Patent No. 782,375, dated February 14, 1905, it may in some instances be desirable to effect the molding from the solid state, as I shall hereafter describe, owing to the ease with which a definite quantitiy of such materials can be measured and the inconvenience of working with the material in a molten state.

In carrying the invention into effect, I rotate a hot mold at high speed and introduce a fusible material therein in the solid state, preferably in the form of powder or small granules, whereby the fusible material will be uniformly distributed over the bore of the mold by the centrifugal force developed and will be melted by the heat of the mold, so as to become fluid and take a very perfect impression from the record surface, at the same time displacing any air or gas bubbles and forcing the same inwardly; after which the mold will be cooled, so as to chill or set the material while the mold is being continuously rotated.

In order that the invention may be better understood, attention is directed to the accompanying drawing, forming part of this specification, and in which—

Figure 1, is a longitudinal sectional view of the preferred apparatus for carrying the method into effect, Fig. 2, a sectional view on the line 2—2 of Fig. 1, Fig. 3, a plan view, showing the heating and cooling mechanism, and Fig. 4, an elevation of the complete mold.

In all of these views corresponding parts are represented by the same numerals of reference.

The base 1 is provided with frames 2—2, in which are mounted the idler rollers 3—3, for supporting the mold 4.

5 is a driving roller for rotating the mold, said roller being carried in a swiveled bracket 6, operated by a handle 7, so that by skewing the roller 5, the mold will be moved longitudinally from its engagement with the idler rollers 3—3, as I describe in said application. The driving roller 5 is rotated by a belt 8, engaging a pulley 9 and driven from a pulley 10.

The mold 4 is of any suitable type, carrying as heretofore the representation in relief of a record on its bore, and is provided with the usual flange 11, and with a removable flange 12, the latter being held in place by a bayonet joint, as shown in Fig. 4. I illustrate a gas burner 13, for heating the mold, and water nozzle 14 for cooling the same. The gas burner and water nozzles are connected to a pivoted body 15, operated by a handle 16, so that either the burner or nozzles may be brought in position below the mold to heat or cool the same. Flexible pipes 17—18 with valves 19—20 convey gas or water to the burner 13 or nozzles 14 respectively. It will be understood that other devices may be employed for heating and cooling the mold and that the mold may be heated to the necessary temperature outside of the apparatus when possessed of sufficient body to effect the melting of the solid material introduced therein.

Preferably the material from which the records are made is contained in powdered form in a receptacle 21, adjacent to the mold, and in this receptacle is mounted a shaft 22, preferably square in cross-section, and having a trough 23 formed therein and arranged to reciprocate with respect to the receptacle. This shaft is mounted in independently rotatable bushings 24, which permit the shaft to be turned with respect to the receptacle when it is desired to empty the charge of material into the mold.

It will be obvious that by moving the shaft 22 to the right (Fig. 1) so as to withdraw the trough 23 within the receptacle 21, the trough will be filled with the powdered or granular material, so that when the shaft is returned to the position shown in Fig. 1 a fixed and definite charge of the material will be introduced within the mold. By now giving the shaft a half rotation, the charge of material will be deposited within the rapidly turning mold, so as to be uniformly distributed over the bore of the same. By reason of the heated condition of the mold, the material will be quickly brought to a fluid state, in which condition it intimately engages the entire record surface, forcing any air or gas bubbles radially inward and taking a very perfect impression. During this operation, the gas burner 13, if used, is maintained beneath the mold, so as to keep the latter in a heated condition. After the impression has been taken and while the mold is still being rapidly rotated, the handle 16 is operated so as to swing the water nozzles 14 beneath the mold, and the valve 20 is operated so as to cause jets of water to impinge against the mold and rapidly cool the same with its charge of material. When the material has been thus set and hardened, the handle 7 is moved to skew the driving roller 5, and force the mold longitudinally from its engagement with the idler rollers, whereupon the operations described are repeated.

A suitable material for use in the carrying of my present process into effect is that disclosed in my said Patent No. 782,375, dated February 14, 1905, which material will be crushed or ground to a powdered or granular condition, after having been formed. Any other fusible material may, however, be employed, such for example, as asphalt, shellac compositions, and compounds of similar nature.

It is possible by this method to make very perfect duplicate records of materials that are so stringy and viscid when in a molten condition that they cannot be effectively molded by existing processes, or whose melting point is so high as to make such processes undesirable.

Having now described my invention, what I claim as new and desire to secure by Letters Patent is as follows:

1. The process of making duplicate phonograph records, which consists in rotating a heated tubular mold at high speed, and in introducing therein a charge of solid fusible material, whereby the material will be melted by the heat of the mold and distributed uniformly over the record surface thereof, substantially as set forth.

2. The process of making duplicate phonograph records, which consists in rotating a heated tubular mold at high speed, and in introducing therein a charge of solid fusible material, whereby the material will be melted by the heat of the mold and distributed over the record surface thereof, and in then rapidly cooling the mold and its contents to solidify and set the latter, substantially as set forth.

3. The process of making duplicate phonograph records, which consists in rotating a tubular mold at high speed, in heating the mold and in introducing therein a charge of fusible solid material, whereby the latter will be melted by the heat of the mold and distributed over the record surface thereof, substantially as set forth.

4. The process of making duplicate phonograph records, which consists in rotating a tubular mold at high speed, in heating the mold and in introducing therein a charge of fusible solid material, whereby the latter will be melted by the heat of the mold and distributed over the record surface thereof, and then in rapidly cooling the mold and its contents to solidify and set the latter, substantially as set forth.

5. The process of making duplicate phonograph records, which consists in rapidly rotating a heated tubular mold and in introducing therein a charge of powdered fusible material, whereby the latter will be melted by the heat of the mold and distributed over the record surface thereof, substantially as set forth.

6. The process of making duplicate phonograph records, which consists in rapidly rotating a heated tubular mold, in introducing therein a charge of powdered fusible material, whereby the latter will be melted by the heat of the mold and distributed over the record surface thereof, and in rapidly cooling the mold and contents to set and solidify the latter, substantially as set forth.

This specification signed and witnessed this 14th day of May 1906.

JONAS W. AYLSWORTH.

Witnesses:
FRANK L. DYER,
ANNA R. KLEHM.